US005651532A

United States Patent [19]

Page

[11] Patent Number: 5,651,532

[45] Date of Patent: Jul. 29, 1997

[54] JACK HANDLE

[76] Inventor: Richard C. Page, 8113 Elmer Hill Rd., Rome, N.Y. 13440

[21] Appl. No.: 464,227

[22] Filed: May 5, 1995

[51] Int. Cl.$^{6}$ .......... B60P 1/48

[52] U.S. Cl. .......... 254/8 B; 254/DIG. 3

[58] Field of Search .......... 254/DIG. 3, 8 R, 254/8 B, 8 C, 120, 129, 1, 124; 16/110 R, 111 R, 114 R; 74/543

[56] References Cited

U.S. PATENT DOCUMENTS

| | | | |
|---|---|---|---|
| 1,282,988 | 10/1918 | Tucker | 254/8 B |
| 1,365,656 | 1/1921 | Burns | 254/DIG. 3 |
| 1,468,771 | 9/1923 | Arnold | 254/DIG. 3 |
| 1,936,642 | 11/1933 | Ramsey | 254/DIG. 3 |
| 1,981,763 | 11/1934 | Usadel | 254/120 |
| 2,173,598 | 9/1939 | Sonderup | 254/1 |
| 3,780,987 | 12/1973 | Craft et al. | 254/8 R |
| 4,277,048 | 7/1981 | Okuda | 254/2 B |
| 5,338,128 | 8/1994 | Blanco | 16/114 R |
| 5,433,127 | 7/1995 | Messier | 16/114 R |

FOREIGN PATENT DOCUMENTS 998550 9/1951 France .

*Primary Examiner*—Robert C. Watson
*Assistant Examiner*—Thomas W. Lynch
*Attorney, Agent, or Firm*—Robert O. Wright

[57] ABSTRACT

A jack handle and adapter bar are shown which permit conventional automotive hydraulic floor jacks to be used to jack up low clearance cars. Full control is obtained without damage to or interference from the car skirt or fairing panels.

11 Claims, 7 Drawing Sheets

JACK HANDLE

This invention relates to a jack handle and more particularly to the actuating and control handle for a conventional automotive hydraulic floor jack.

BACKGROUND OF INVENTION

For many years now most automotive service facilities have had one or more hydraulic floor jacks for elevating a wheel of a car for servicing same. These jacks typically have been mounted on wheels so they can easily be positioned under a car and have had a long straight handle connected to the jack actuating and control lever. Rotary motion of the handle has usually been used to open and close the hydraulic control valve in the jack and vertical reciprocating motion of the handle has been used to pump hydraulic fluid from a reservoir to a cylinder which raises an arm to contact and lift a car when the control valve is set to the proper position. These jacks have served the industry well for many years as long as there has been adequate clearance for the handle to be moved up and down to pump hydraulic fluid into the jacking cylinder.

Recently the newer cars have been adding skirts and fairing panels underneath the conventional car bumpers to improve appearance and performance. This has been particularly so with the sportier models. With these types of cars it is virtually impossible to move the usual floor jack handle up and down enough to pump any hydraulic fluid to raise the jack arm to lift a car.

OBJECTS AND SUMMARY OF INVENTION

Accordingly it is an object of the present invention to provide a jack handle that overcomes the limitations of the prior art.

It is another object of the present invention to provide a jack handle that allows conventional automotive hydraulic floor jacks to be used to elevate low clearance cars.

It is another object of the present invention to provide a jack handle for automotive hydraulic floor jacks that permits both rotary and vertical reciprocating motion to actuate the floor jack without damage to low slung cars.

It is another object of the present invention to provide a jack handle for automotive hydraulic floor jacks that permits full range pumping action of the floor jack when placed under low clearance vehicles and machinery.

It is a still further object of the present invention to provide a jack handle adapter for automotive hydraulic floor jacks that permits use of existing floor jacks and handles under low clearance cars.

These and other and further objects of the invention are obtained in one embodiment in which the handle portion of the jack handle is off set from the jack engaging portion a distance sufficient to permit full pumping of the jack handle without hitting a low clearance vehicle.

DESCRIPTION OF A PREFERRED EMBODIMENT

Figure 1:
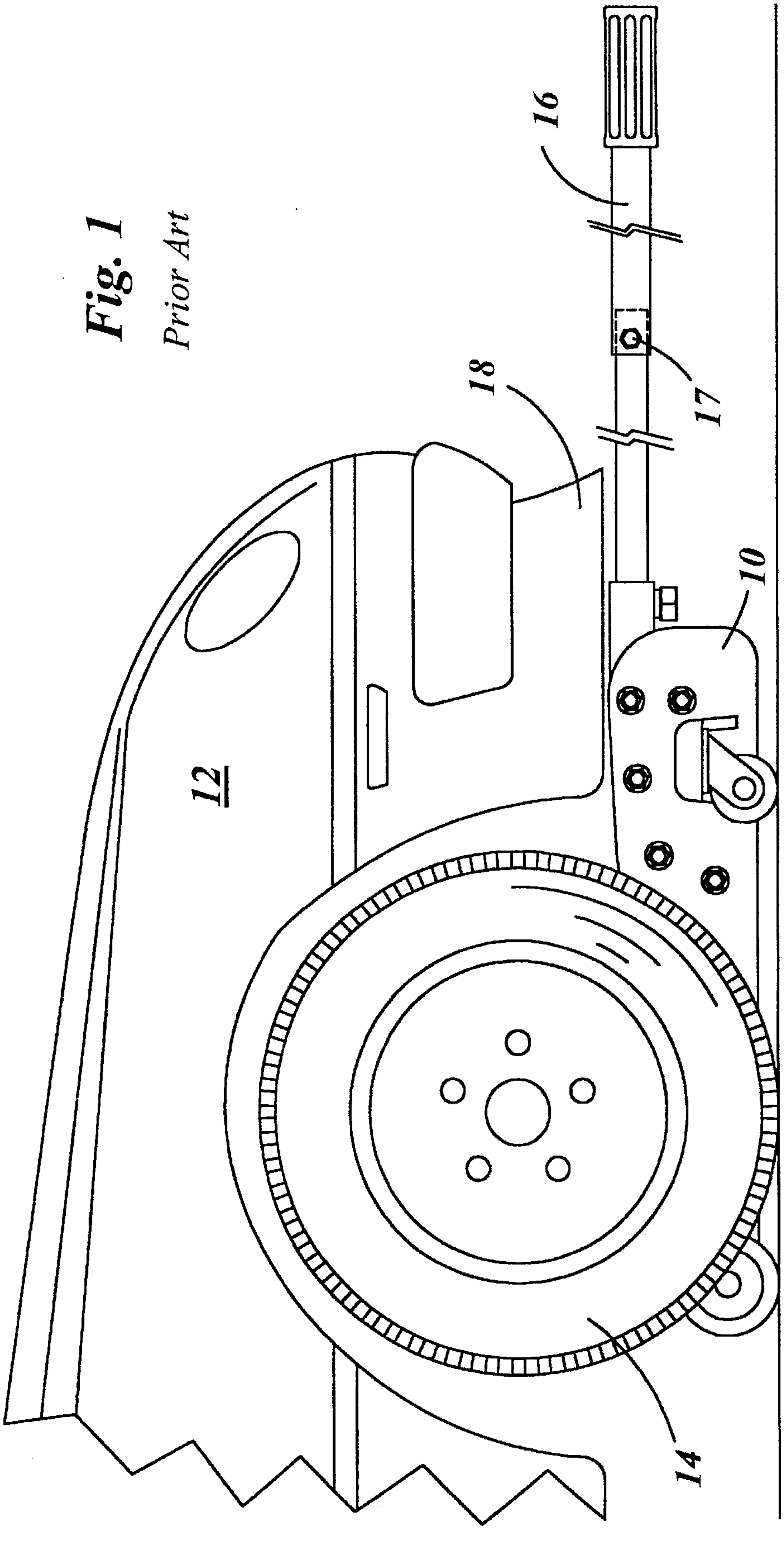
Fig. 1 Prior Art
FIG. 1 is a side view of a prior art hydraulic floor jack positioned under a low clearance car.

Referring now to FIG. 1 there is shown a conventional hydraulic floor jack 10 positioned under a modern low clearance car 12 to raise the wheel 14 off the ground for service. Handle 16 generally consists of two pieces joined together by a bolt 17 with a jack engaging lug portion at one end and a hand grip portion at the other. As can be seen skirt 18 prevents the jack handle 16 from being pumped up and down to cause the hydraulic fluid to raise the jack arm into contact with the undercarriage of the car. Thus the standard hydraulic floor jack has been rendered unuseable for raising the wheel of a low clearance car.

Figure 2:
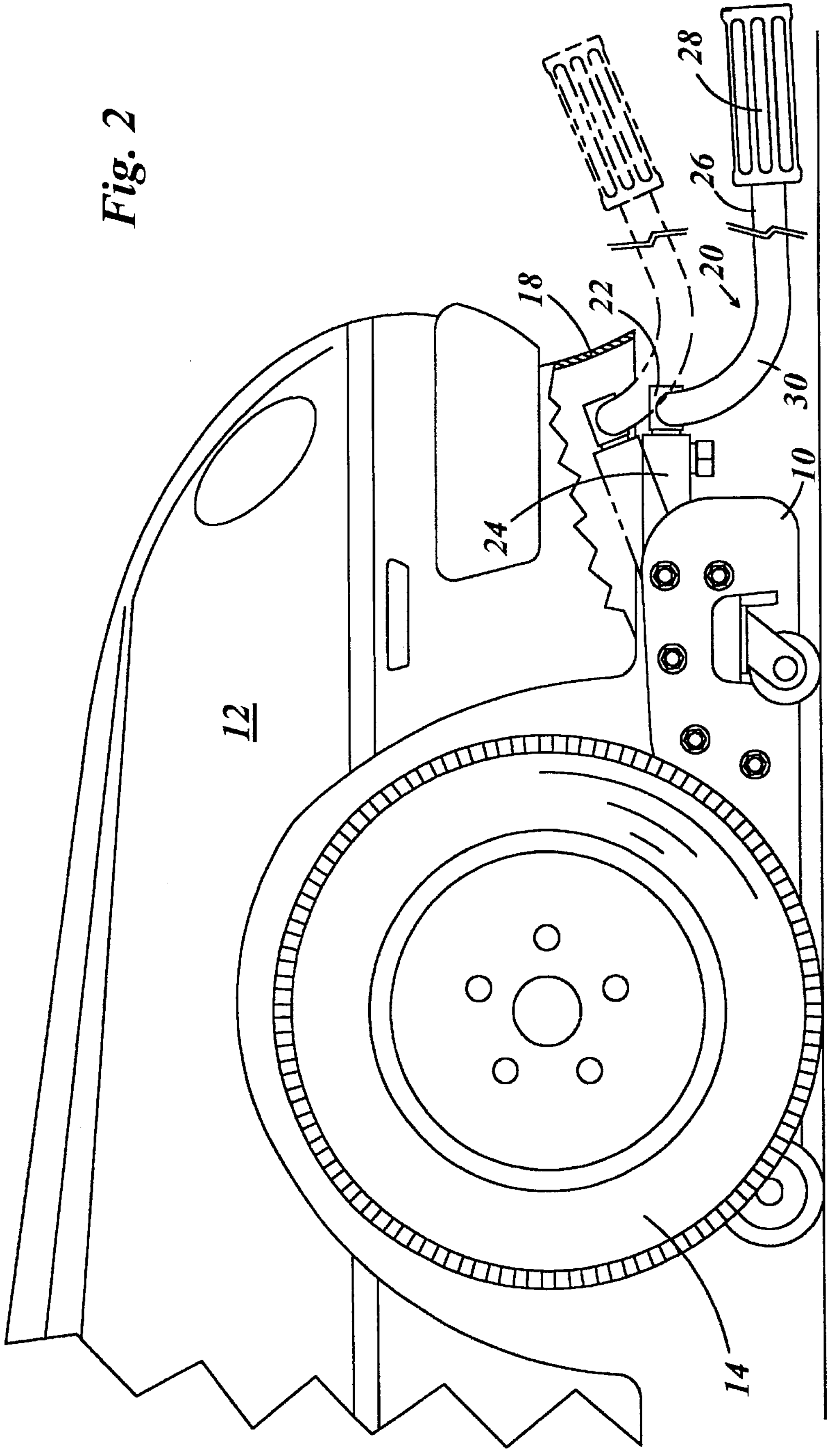
FIG. 2 is a view similar to FIG. 1 showing a handle according to the present invention installed on a floor jack.

Referring now to FIG. 2 a jack handle 20 according to the present invention permits the standard floor jack 10 to be used to raise the wheel 14 off the floor even though the car has a low clearance spoiler or skirt 18. Handle 20 according to the present invention has a jack engaging lug portion 22 at the left in FIG. 2, which is adapted to operatively engage the jack operating lever 24 of the standard floor jack 10. Handle 20 has an elongated operating handle portion 26 with a hand grip 28 on the right hand end in FIG. 2 and a curved off set portion 30 on the left hand end. The end of the curved portion 30 is welded or otherwise fixed to the jack engaging lug portion 22. Curved portion 30 is bent to an angle of approximately ninety degrees relative to the operating handle portion 26 on a radius 32 (FIG. 4) of four to six inches. The radius 32 is chosen so that when the jack operating lever 24 is in the horizontal position the curved end 30 of the handle 20 just clears the floor.

Thus when the offset handle 20 is operated it can be pumped up to the dotted line position of FIG. 2 and back down to the solid line position without ever touching the skirt 18 of the car. This allows the jack operating lever 24 to travel through its normal operating range to pump hydraulic fluid from the reservoir to the hydraulic cylinder to raise the jack arm to lift the wheel 14 off the floor.

In addition as will be described in detail in connection with FIGS. 6 and 7 the jack engaging lug portion 22 is secured to the jack operating lever 24 by the usual roll pin, slot and bolt arrangement which secures the regular handle 16 in the jack engaging lug portion of the standard floor jack 10. In this manner the handle 20 may be rotated to open and close the conventional control valve in the standard floor jack which controls the raising and lowering of the jack arm as is well known in the art. Again this can be accomplished without causing the handle 30 to contact the skirt 18 during operation of the floor jack 10. Jack handle 20 may have an overall length of between forty and sixty inches.

The axis of the handle portion 26 in addition to being offset from the axis of the lug portion 22 is not parallel thereto but set to converge at a small angle of from one to five degrees. This ensures that the handle grip 28 end of handle 20 will be positioned a few inches off the floor when in the lower position of the pumping action so that the operator can easily grasp the handle 28 with his hand without hitting his hand on the floor when using the floor jack. In a preferred embodiment an angle of two and one half degrees and a length of forty inches have been found satisfactory.

Figure 3:
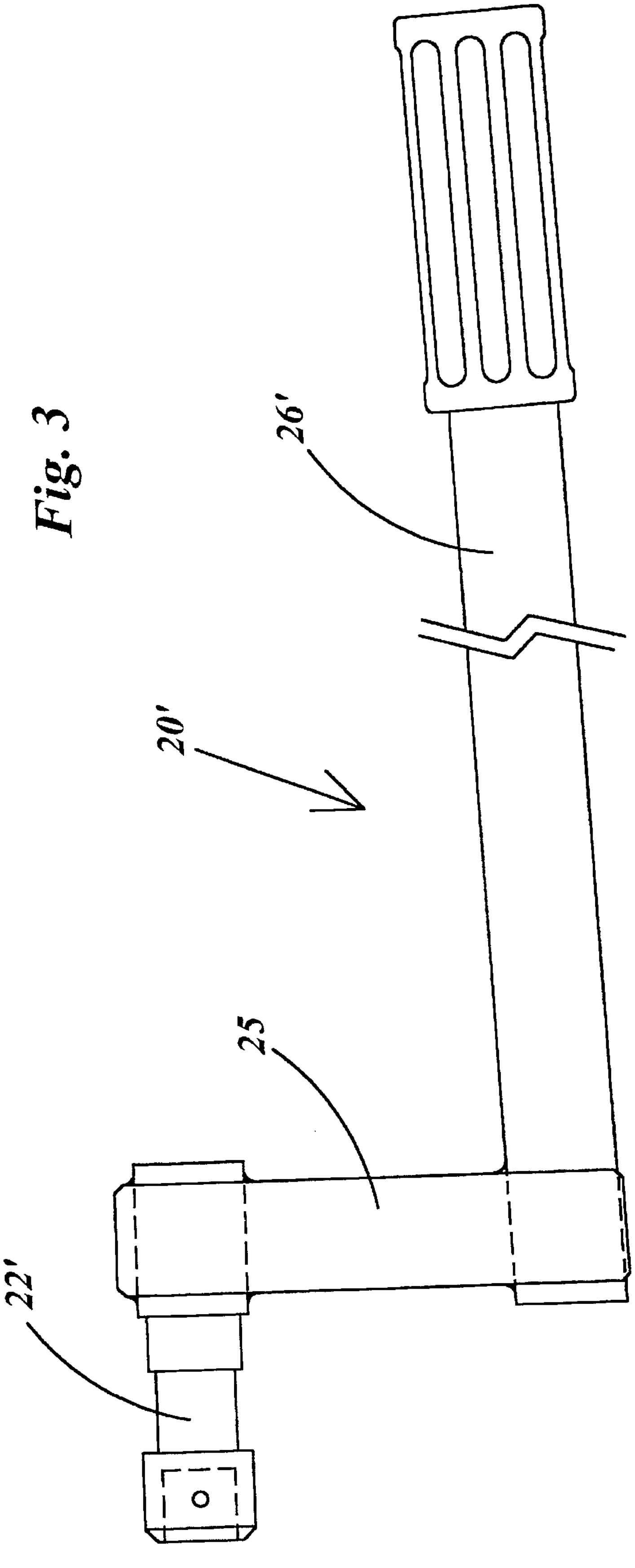
FIG. 3 is side view of another embodiment of a jack handle according to the present invention.

FIG. 3 shows another embodiment of a handle 20' wherein the handle portion 26' is spaced from and joined to the jack engaging lug portion 22' by a weldment 25 fixed at approximately ninety degrees to lug portion 22' and handle portion 26' minus the desired convergence as described in connection with the FIG. 2 embodiment.

Figure 4:
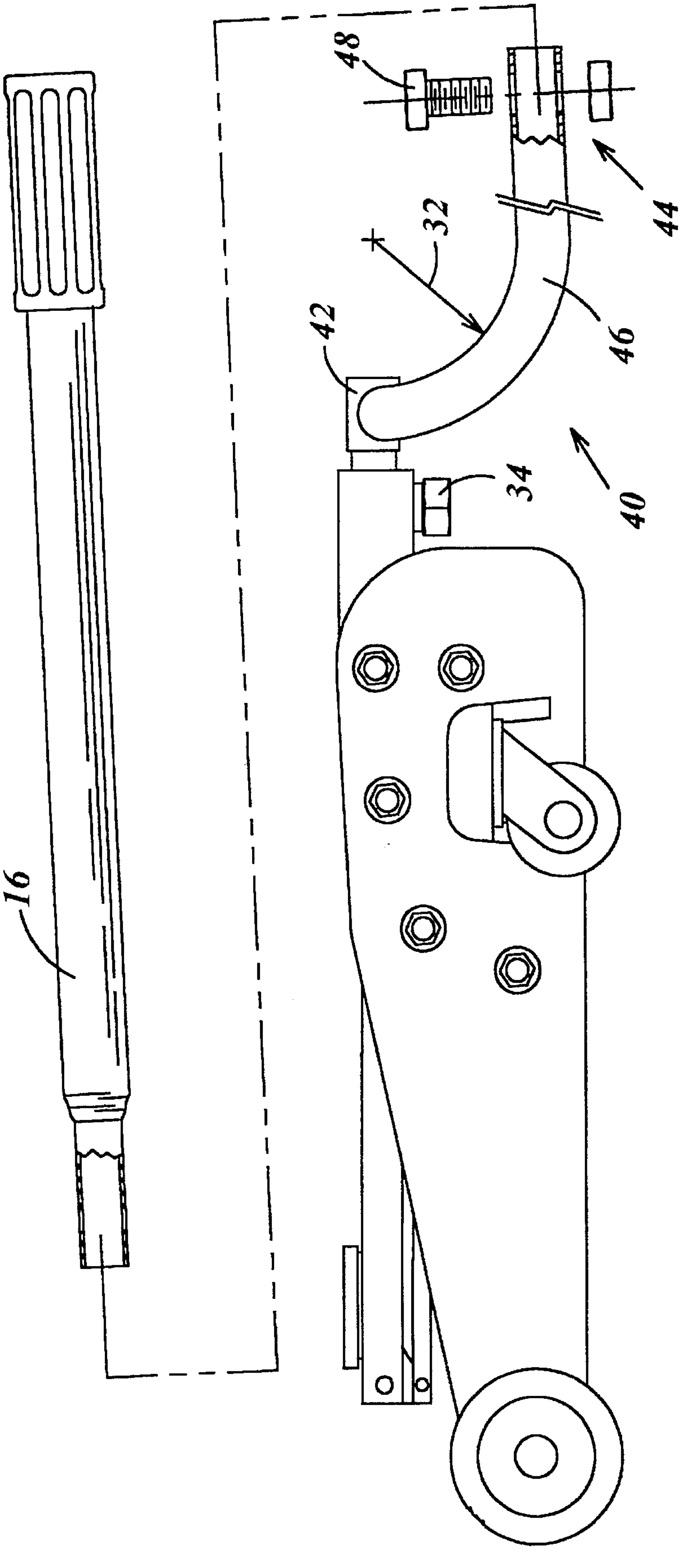
FIG. 4 is a side view of an hydraulic floor jack with a jack handle adapter installed on the jack actuating lever and the regular jack handle installed in the end of the adapter.

Referring now to FIG. 4 there is shown an embodiment preferred for some applications of the present invention. A jack handle adapter bar 40 has a jack engaging lug portion 42 at one end and a handle engaging portion 44 at the other end. Portions 42 and 44 are joined by a curved section 46 similar to section 30 of the embodiment of FIG. 2. Section 46 is welded to the lug portion 42 and handle engaging portion 44 is adapted to receive the reduced diameter end of the standard floor jack handle 16 therein. A bolt 48 is provided to secure handle 16 into adapter bar 40 and lug portion 42 is similarly fixed to jack operating lever 24 as described in connection with FIG. 2. The axis of handle engaging portion 44 is offset from the axis of lug portion 42 by the same distance and angle as handle 20 and lug portion 22 are in FIG. 2. Again the radius of curvature is the same for similar floor jacks and applications. The length of adapter bar 40 is preferably between six and thirty inches although other lengths may on occasion be used.

Figure 5:
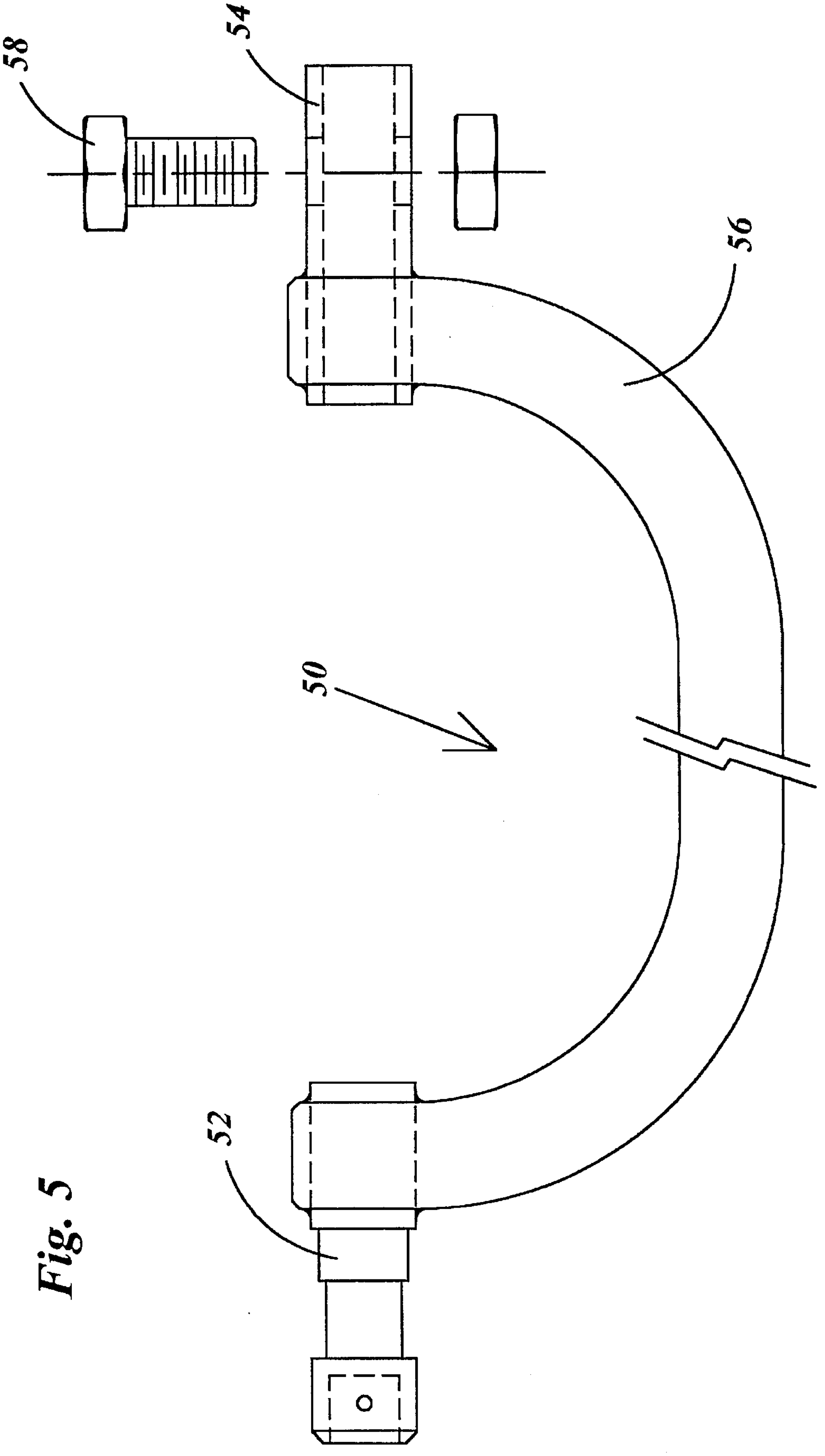
FIG. 5 is a partial view similar to FIG. 4 of still another embodiment of the present invention.

FIG. 5 shows another embodiment of a jack handle adapter bar 50 wherein the jack engaging lug portion 52 is connected to the handle engaging portion 54 by a "U" shaped section 56. Section 56 has a depth equal to the offset of section 46 in FIG. 4 and a length from lug 52 to handle engaging portion 54 sufficient to extend from the floor jack actuating lever to beyond any skirt or other low clearance part of the object to be elevated by the floor jack. Typically a length of six to thirty inches has been found to be satisfactory. As in FIG. 4 the standard handle from the floor jack can be inserted into the handle engaging portion 54 and bolted in place by a bolt 58 and the lug portion 52 is joined to the jack actuating lever 24 as shown in FIGS. 6 and 7. The axes of the lug portion 53 and the handle engaging portion 54 can be aligned without the two and one half degree convergence of FIG. 2.

In use all of the embodiments shown allow the conventional hydraulic floor jack to be fully operated under low clearance vehicles and other objects greatly extending the utility of the standard floor jack.

Figure 6:
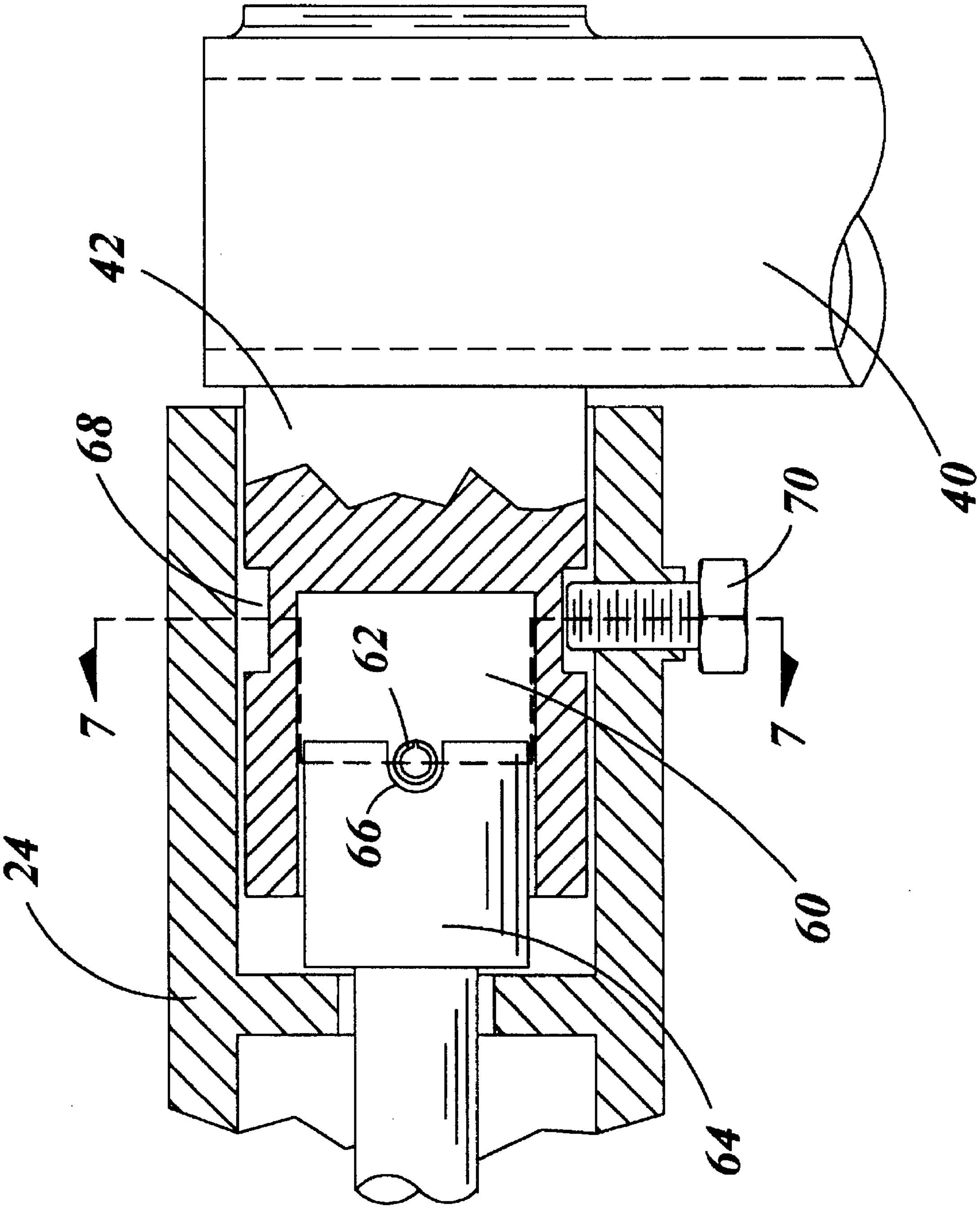
FIG. 6 is a side view partially in section of the jack engaging lug portion of a handle.
Figure 8:
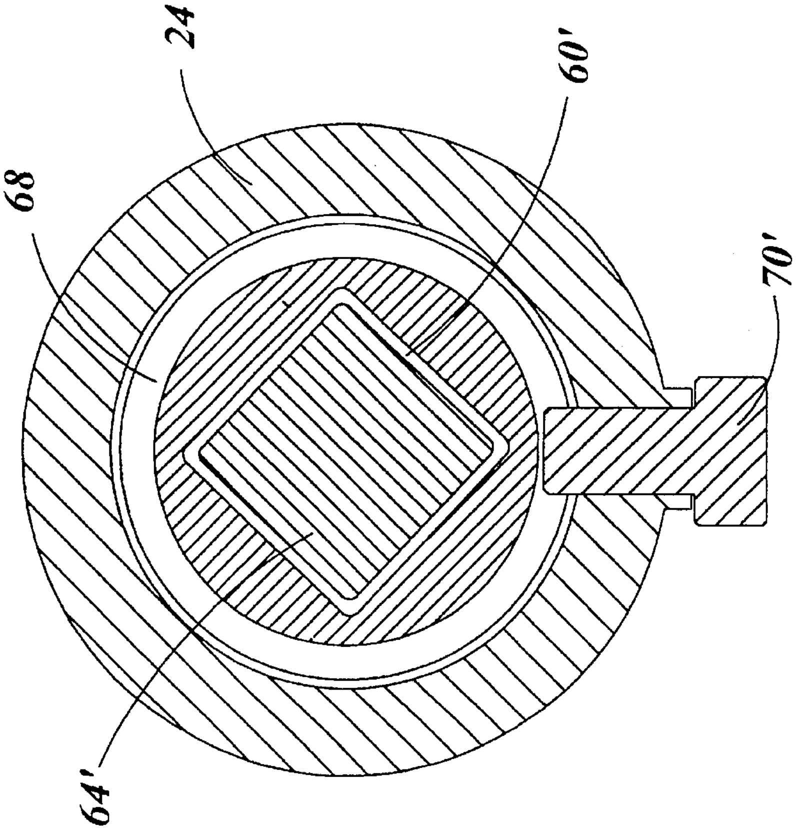
FIG. 8 is a cross sectional view similar to FIG. 7 of another embodiment of the present invention.
Figure 7:
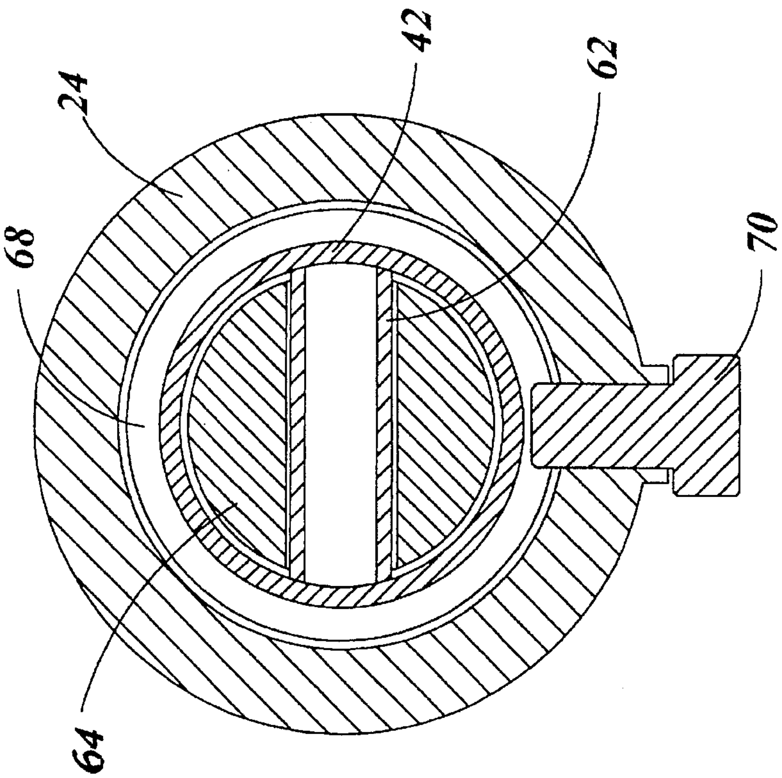
FIG. 7 is a sectional view taken on line 7—7 of FIG. 6.

Referring now to FIGS. 6–8 there are shown two of the conventional ways of ensuring that rotation of the handle of an hydraulic floor jack will transmit rotary motion to the floor jack actuating lever which in turn opens and closes the floor jack control valve. FIG. 6 shows the roll pin, slot and bolt attachment of the adapter bar 40 to the jack actuating lever 24. Lug portion 42 has at its distal end a cylindrical receptacle 60 with a roll pin 62 fixed therein on a diameter thereof. Receptacle 60 is sized to receive the standard cylindrical stud 64 of the conventional floor jack which has an open slot 66 in the end to receive roll pin 62. An annular groove 68 in the outer surface of receptacle 60 is provided to receive bolt 70 which is threaded in the outer sleeve of jack actuating lever 24. In this manner the handle or adapter bar of the embodiments of the present invention are secured to the standard hydraulic floor jacks and upon rotation thereof actuate the control valve of the standard jack for raising or lowering of the jack arm.

FIG. 8 shows another means for transmitting rotary motion in some standard floor jacks. In this embodiment a square male stud 64' on the jack actuating lever mates with a corresponding square hole in receptacle 60' of the jack engaging lug portion of the handle or adapter bar of the present invention. Locking bolt 70' completes the attachment and a roll pin obviously is no longer needed for this mounting to function equally well for certain applications.

While this invention has been explained with reference to the structures disclosed herein, it is not confined to the details as set forth and this application is intended to cover any modifications and changes as may come within the scope of the following claims.

What is claimed is:

1. In an hydraulic floor jack of the type having a wheeled rectangular base, an hydraulic cylinder and valve actuating lever, with a longitudinally extending straight elongated jack handle removably fixed thereto and forming an axial extension thereof, for rotary motion to open and close a valve and for vertical reciprocating motion to pump hydraulic fluid to an hydraulic cylinder adapted to elevate an arm to contact the underbody of a car to lift a portion thereof off the floor, the improvement which comprises:

- an offset jack handle having at one end a jack engaging lug portion and at the other end an elongated portion adapted to function as a handle;
- said jack engaging lug portion having means for engaging said hydraulic cylinder and valve actuating lever for rotary and vertical reciprocating motion thereof;
- said jack engaging lug portion and elongated portion each having a longitudinal axis;
- said jack engaging lug and elongated portions longitudinal axes being spaced apart from each other a predetermined distance;
- said predetermined distance being chosen to offset said elongated portion a distance sufficient to clear any projecting parts of a car to be lifted by said floor jack and allow full vertical reciprocating motion of said elongated portion to operate said floor jack in normal fashion; and
- said jack engaging lug portion and elongated portion longitudinal axes being vertically spaced apart a distance equal to the distance from the floor jack actuating lever, when horizontal, to the floor on which the floor jack is positioned.

2. An offset jack handle according to claim 1 wherein the longitudinal axes of said jack engaging lug portion and elongated portion are not parallel.

3. An offset jack handle according to claim 2 wherein said jack engaging lug portion and elongated portion axes converge at an angle of convergence of between one and five degrees.

4. An offset jack handle according to claim 3 wherein said angle of convergence is two and one half degrees whereby when said offset jack handle is mounted on a floor jack actuating lever in the horizontal position the (proximal) end of said offset handle elongated portion proximal to said floor jack just clears the floor and the distal end of the elongated portion of said offset jack handle is elevated off the floor.

5. A jack offset handle according to claim 1 wherein said elongated portion and said jack engaging lug portion are joined together by a length of cylindrical tubing bent through an angle of ninety two and one half degrees plus or minus two and one half degrees on a radius of between four and six inches.

6. A jack offset handle according to claim 1 wherein said elongated portion and said jack engaging lug portion are each welded to opposite ends of a bar member having a length equal to said predetermined distance and extend therefrom in opposite directions at approximately ninety degrees thereto.

7. In an hydraulic floor jack of the type having an hydraulic cylinder and valve actuating lever, with an elongated straight handle adapted to be fixed thereto and form an axial extension thereof, for rotary motion to open and close a valve and for vertical reciprocating motion to pump hydraulic fluid to an hydraulic cylinder adapted to elevate an arm to contact the underbody of a car to lift a portion thereof off the floor, the improvement which comprises:

an offset jack handle adapter bar having at one end a handle engaging portion and at the other end a jack engaging lug portion;

said jack engaging lug portion and handle engaging portion each having a longitudinal axis; and said jack engaging lug and handle engaging portions longitudinal axes being offset from each other a predetermined distance such that when said adapter bar is mounted on a floor jack said axes are spaced apart vertically a distance equal to the distance from the floor jack actuating lever, when horizontal, to the floor on which the floor jack is positioned.

8. A jack handle adapter bar according to claim 7 wherein the longitudinal axes of said jack engaging lug and handle engaging portions are not parallel; and the angle of convergence of said jack engaging lug portion and handle engaging portion axes is between one and five degrees.

9. A jack handle adapter bar according to claim 8 wherein said angle of convergence is two and one half degrees whereby when said adapter bar is mounted on a floor jack actuating lever in the horizontal position, the proximal end of said jack handle adapter bar just clears the floor and the distal end of a floor jack handle mounted in said adapter bar handle engaging portion is elevated off the floor.

10. A jack handle adapter bar according to claim 7 wherein said handle engaging portion and said jack engaging lug portion are joined together by a length of cylindrical tubing bent through an angle of ninety two and one half degrees plus or minus two and one half degrees on a radius of between four and six inches.

11. A jack handle adapter bar according to claim 10 wherein the overall length from the jack engaging lug portion to the handle engaging portion is between six and thirty inches.

* * * * *